(12) United States Patent
Evrard

(10) Patent No.: US 7,140,871 B2
(45) Date of Patent: Nov. 28, 2006

(54) CAM-TYPE GUIDING DEVICE AND MOLDING INSTALLATION USING SAME

(75) Inventor: Alain Evrard, Octeville-sur-Mer (FR)

(73) Assignee: Sidel, Octeville-sur-Mer (FR)

(*) Notice: Subject to any disclaimer, the term of this patent is extended or adjusted under 35 U.S.C. 154(b) by 309 days.

(21) Appl. No.: 10/489,191

(22) PCT Filed: Dec. 6, 2002

(86) PCT No.: PCT/FR02/04213

§ 371 (c)(1),
(2), (4) Date: Apr. 9, 2004

(87) PCT Pub. No.: WO03/050438

PCT Pub. Date: Jun. 19, 2003

(65) Prior Publication Data

US 2004/0255715 A1    Dec. 23, 2004

(30) Foreign Application Priority Data

Dec. 12, 2001  (FR) .................................. 01 16030

(51) Int. Cl.
*B29C 49/56*   (2006.01)

(52) U.S. Cl. .................. 425/540; 74/567; 425/541

(58) Field of Classification Search ............... 425/540, 425/541; 74/567; 65/237, 238
See application file for complete search history.

(56) References Cited

U.S. PATENT DOCUMENTS

| 231,145 | A | * | 8/1880 | Brady ..................... 74/569 |
| 2,660,088 | A | * | 11/1953 | Serra .................... 74/54 |
| 3,304,791 | A | | 2/1967 | Geeson |
| 3,851,579 | A | * | 12/1974 | Zurick ................... 101/39 |
| 3,978,741 | A | * | 9/1976 | Bettiol .................. 74/568 R |
| 4,018,151 | A | * | 4/1977 | Urban et al. ........... 74/568 R |
| 4,821,638 | A | * | 4/1989 | Uithoven ................ 101/40 |
| 6,694,843 | B1 | * | 2/2004 | Bartosch et al. ........ 74/567 |

FOREIGN PATENT DOCUMENTS

| EP | 0 935 920 A2 | 8/1999 |
| GB | 829 519 A | 3/1960 |

* cited by examiner

*Primary Examiner*—Robert B. Davis
(74) *Attorney, Agent, or Firm*—Sughrue Mion, MIX

(57) ABSTRACT

A cam-operated guiding device for controlling a related movement of a member which is moreover continuously displaced, the device including two mutually transversely offset parallel cams with which co-operate respectively two coaxial rollers for bilaterally guiding said member. One of the cams is mounted via elastically deformable members designed to allow an elastic displacement of the cam relative to the other cam.

8 Claims, 2 Drawing Sheets

CAM-TYPE GUIDING DEVICE AND MOLDING INSTALLATION USING SAME

BRIEF DESCRIPTION OF THE INVENTION

The present invention relates to improvements to cam-type guiding devices for controlling a related movement of a member that is independently driven with a continuous displacement, said device comprising two parallel cams, offset transversely from each other, acting on two respective coaxial rollers for bilateral guidance of the abovementioned member.

DESCRIPTION OF THE PRIOR ART

To express things more concretely, a device of the kind considered here is illustrated in FIGS. 1 and 2 of the appended drawings, which are, respectively, a top view of the guiding device and a partial view of the same device shown in cross section taken on the line marked II—II in FIG. 1. Fixed on a common base 1 are two elongate parts 2 and 3, usually made of steel, whose opposing edges 4 and 5, respectively, have a curved longitudinal profile while also being parallel with each other. These cam edges are designed to guide positively, by bilateral contact, a roller. Since, however, the single roller cannot be in simultaneous contact with both cam edges 4 and 5, the two cams 4 and 5 are offset transversely with respect to each other and two rollers 6 and 7 are mounted on the same spindle 8 in contact with the respective cams 4 and 5, the spindle 8 being carried by the member 9 which is to be guided or by an accessory of the member that is to be guided.

Such guiding devices find application particularly, though not exclusively, in moveable, and in particular rotating molding installations with jackknife-type molds for the production, by blow molding or stretch-blow molding, of containers, such as bottles, in thermoplastic polyester, such as PET, from a heated preform, said installations comprising a cam and roller-type guiding device for controlling the opening and closing of said jackknife-type molds, at the same time as said molds are driven with a continuous displacement.

In installations of the kind indicated, usually laid out in the form of a rotating carousel carrying several, sometimes several tens of jackknife-type molds, the cam and roller-type guiding devices used to open and close the molds have been perfectly satisfactory as long as the rate of production of the containers (and therefore the speed at which the installation is run) remains below a certain threshold.

However, problems have occurred when speeding up the installation to increase the rate of production of containers in response to user demand: the installation has become noisy and malfunctions have developed, not only mechanical but also electrical or electronic, and it proved impossible to find the source of these.

Lastly, measurements carried out on the instantaneous loads between cams and rollers have revealed that the actual loads are considerably higher (some ten times higher) than those estimated.

It was then discovered that, at the higher speeds at which it was wished to run the installation, the rollers did not stay in continuous contact with the cams, and that this contact was accompanied by a phenomenon of rebound caused by the rollers coming too suddenly into contact with the cams. The two opposing cams are of course fixed rigidly to a common base and define between them a passage that offers only a very small amount of play for the two coaxial and contra-rotating rollers of each pair of rollers.

It is therefore the conjunction of this rebound phenomenon occurring to a significant extent, with the insufficient amount of play between the cams which gives rise to vibrations that propagate through the installation and give rise to the noises and malfunctions observed.

In addition to this, several successive molds are operated simultaneously while at different functional phases. The cams are therefore very long and several pairs of rollers are engaged simultaneously in contact with them. The successive rebounding of consecutive pairs of rollers naturally generates resonance which further aggravates the problems discussed above.

SUMMARY OF THE INVENTION

It is a basic aim of the invention to find a solution to the problems observed hitherto and to provide an improved arrangement designed to lead to a stable and regular operation which will no longer generate vibrations and which, in addition, will enable the speed of operation of the installation to be further increased.

For these purposes, a guiding device as set out in the preamble is characterized, being constructed in accordance with the invention, in that one of the cams is mounted via elastically deformable means, capable of allowing an elastic displacement of said cam relative to the other cam.

By means of this arrangement, the elastically mounted cam is able to absorb the shock when the roller strikes it and the rebound phenomenon is if not eliminated at any rate greatly attenuated and rapidly damped. The vibrations are eliminated or at any rate greatly attenuated in the installation, which as a result becomes less noisy.

In a preferred embodiment, the elastically deformable means comprise a block of elastically deformable, and in particular an elastomeric material interposed between said cam and a supporting base on which the other cam is mounted in a fixed manner. However, other technical solutions are of course conceivable: for example, the cam could be fixed to a supporting base by threaded members with respective elastically deformable intermediate bushings between said threaded members and respective bores in the base.

To avoid the phenomenon of resonance due to the simultaneous engagement of several pairs of rollers with the two cams, it is advantageous for said elastically mounted cam to be constructed in the form of several cam lengths arranged end to end, the number of these lengths being equal to or greater than the number of rollers capable of being engaged simultaneously in contact with said cam and the length of the cam lengths being decided, in relation to the interval separating successive rollers, in such a way that each elastically mounted cam length is in contact with only one roller. Each cam length is thus mechanically disconnected from the adjacent length or lengths and is pushed back elastically only by the one roller with which it is in contact, no interference occurring with rollers situated upstream or downstream.

To ensure that a step does not develop between the adjacent ends of two successive cam lengths causing a shock and therefore a vibration resulting in a noise when a roller passes over it, it is envisaged that the continuity of the surface with which the roller is in contact be ensured by the fact that two adjacent cam lengths meet with a mutual diagonal overlap.

As indicated earlier, the arrangements of the invention find a preferred, but non-restrictive application to a moveable and in particular rotating installation for the molding of containers, such as bottles, in thermoplastic polymer such as PET, for opening and closing the jackknife molds.

BRIEF DESCRIPTION OF THE DRAWINGS

A clearer understanding of the invention will be gained from reading the detailed description of certain preferred embodiments given purely as non-restrictive examples. This description refers to the appended drawings, in which.

DETAILED DESCRIPTION OF THE INVENTION

Figure 1:
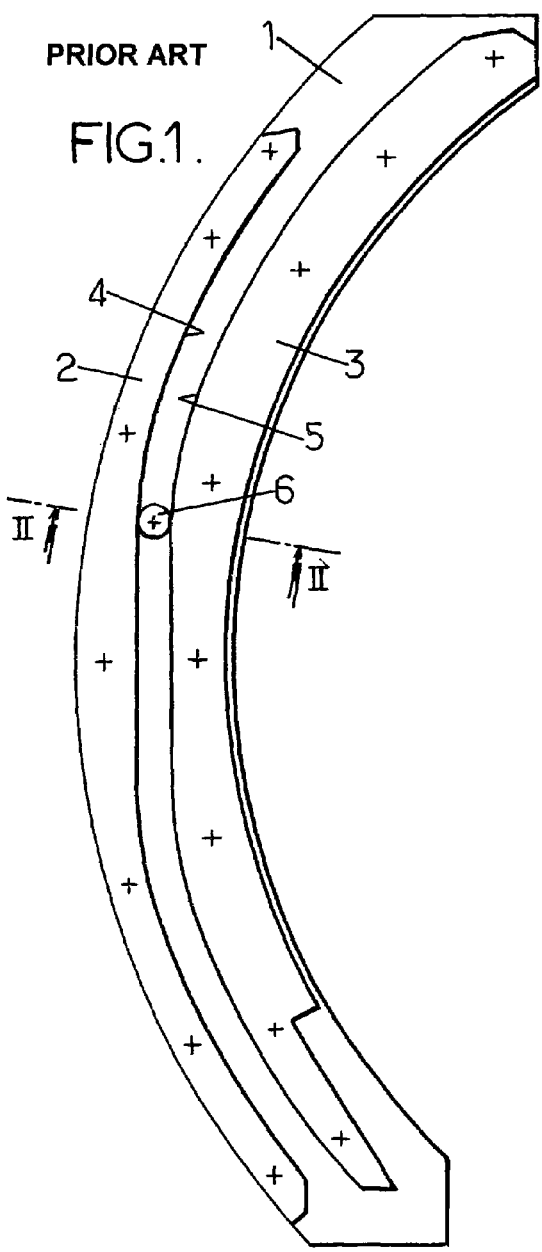
FIGS. 1 and 2 are respectively a top view and a cross-section view, along the line II—II of FIG. 1, of a guiding device of the prior art.
Figure 2:
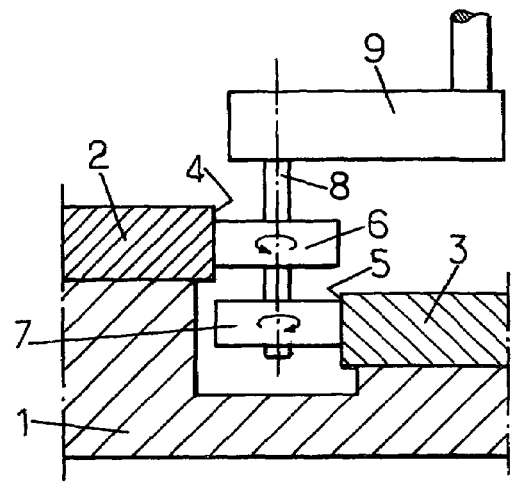
Figure 3:
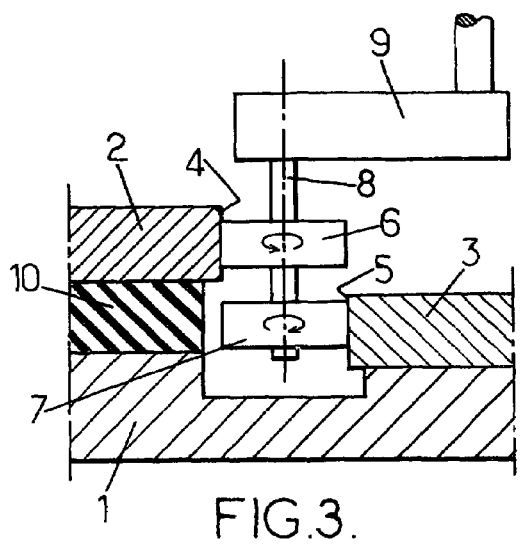
FIGS. 3 and 4 are partial schematic views similar to FIG. 2 and each illustrate a different embodiment in accordance with the invention.

Referring first of all to FIG. 3, which is similar to FIG. 2 except for the provisions of the invention, and in which the same reference numbers are repeated to denote identical parts, the two elongate parts 2 and 3 are mechanically decoupled by mounting one of the parts (part 2 in the example illustrated) on the base 1 via elastically deformable means that allow an elastic displacement of the corresponding cam surface 4 relative to the other cam surface 5.

A variety of ways may be implemented to realize this provision.

In the preferred embodiment more particularly shown in FIG. 3, the elastically deformable means take the form of a block 10 of elastic material, such as an elastomer, interposed between said elongate part 2 and the base 1 on which the other elongate part 3 is still mounted in a fixed manner.

Figure 4:
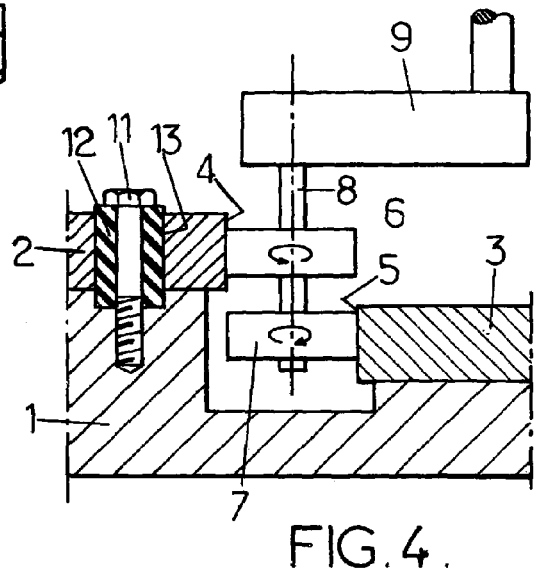

FIG. 4 illustrates another possible embodiment in which the elongate part 2 is fixed to the base 1 by screws 11 with an intermediate elastically deformable bushing 12, of for example elastomer, between the shank of the screw 11 and the bore 13 cut into the part 2.

Whichever solution is adopted, the elongate part 2 can retreat laterally, in other words the cam surface 4 can move transversely away from the opposing cam surface 5 when the roller 6 applies an excessive load to it, for example due to a rebound.

However, the proposed solution alone may prove insufficient where several successive rollers are simultaneously engaged in contact with the cam surface 4, because the reactions of the various rollers may combine together and cause resonance.

Figure 5:
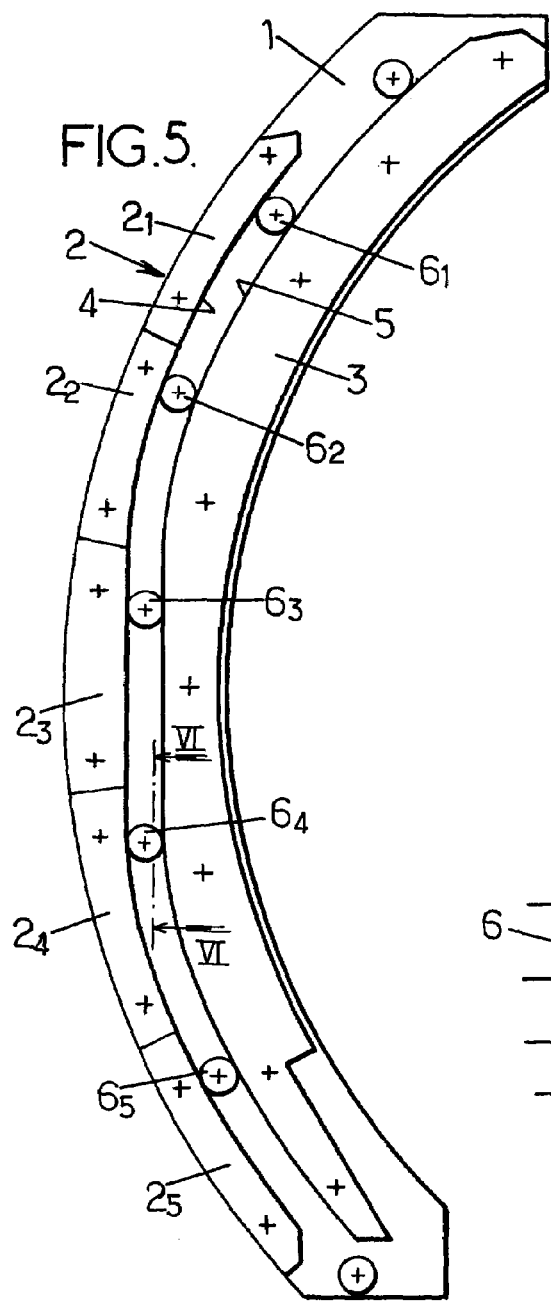
FIG. 5 is a top view, similar to FIG. 1, illustrating another preferred embodiment of the provisions of the invention.

In this case, it is highly advantageous to decouple the areas of contact between the cam 4 and the various successive rollers. In other words, the elongate part 2 is cut up into a number of cam lengths $2_1, 2_2, \ldots, 2_n$ equal to or greater than the number n of rollers $6_1, 6_2, \ldots, 6_n$ that can be simultaneously in contact with said cam surface 4 all the way along its length. FIG. 5 illustrates one embodiment laid out in this way: the cam surface 4 can be contacted simultaneously by five rollers $6_1$ to $6_5$ and the elongate part 2 is made up of five cam lengths $2_1$ to $2_5$ arranged one after the other. Because of the elastic mounting of each length $2_1$ to $2_5$ on the base 1, any shock or vibration communicated to one of the cam lengths is not retransmitted to the adjacent length(s).

As a matter of preference, it is desirable that the number of lengths should be at least one greater than the number of rollers pressing against the cam surface, in order to ensure that each length receives the contact of only one roller.

In the configuration described above, the elastic mounting of the cam lengths $2_1$ to $2_5$ seems to be required to be done in the most appropriate way by using an elastic block (or individual elastic blocks) as illustrated in FIG. 3 or elastic bushings as illustrated in FIG. 4.

Figure 6:
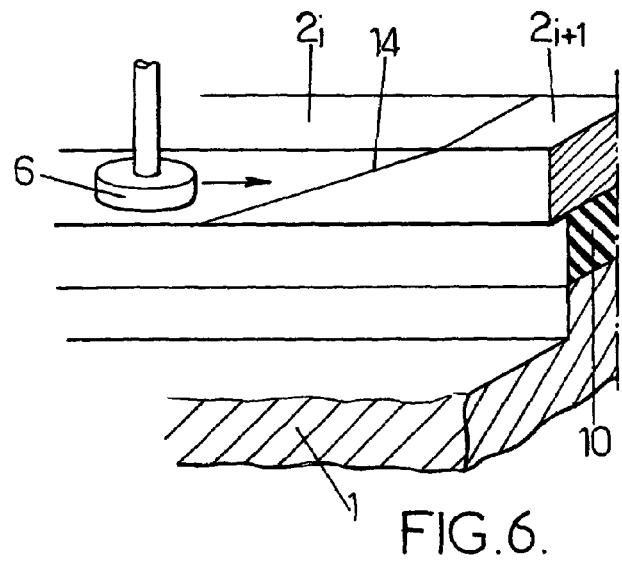
FIG. 6 is a side view taken on the line marked VI—VI in FIG. 5, of part of the device of FIG. 5.

In addition, to prevent shocks as a roller 6 passes from one end of one cam length $2_i$ to the adjacent end of the next length $2_{i+1}$ particularly when one of them is offset transversely with respect to the other, it will be preferable to use the arrangement shown in FIG. 6: the two adjacent ends of the successive lengths $2_i$, $2_{i+1}$ meet not with butted cross sections but with complementary beveled sections laid together to form a joint plane 14 which slopes in the longitudinal direction of the cam, so that the passage of a roller 6 from one length $2_i$ to the other $2_{i+1}$ is progressive.

The invention claimed is:

1. A cam-type guiding device for controlling a related movement of a member that is independently driven with a continuous displacement, said device comprising two parallel cam, offset transversely from each other, acting on two respective coaxial rollers for bilateral guidance of the above-mentioned member,
    wherein one of the cams is mounted via elastically deformable means capable of allowing an elastic displacement of said cam relative to the other cam.

2. The device as claimed in claim 1, wherein the elastically deformable means comprise a block of elastic material interposed between said cam and a supporting base on which the other cam is mounted in a fixed manner.

3. The device as claimed in claim 2, wherein the elastically deformable means comprise a block made of elastomer.

4. The device as claimed in claim 2, wherein the cam is fixed to a supporting base by threaded members with respective elastically deformable intermediate bushings between said threaded members and respective bores in the base.

5. The device as claimed in claim 1, wherein said elastically mounted cam is constructed in the form of several cam lengths arranged end to end, the number of these lengths being equal to or greater than the number of rollers capable of being engaged simultaneously in contact with said cam and the length of the cam lengths being decided, in relation to the interval separating successive rollers, in such a way that each elastically mounted cam length is in contact with only one roller.

6. The device as claimed in claim 5, wherein the number of lengths is at least one greater than the number of rollers engaged simultaneously in contact with the cam, by means of which each length receives contact from only one roller.

7. The device as claimed in claim 5 wherein two adjacent cam lengths meet with a mutual diagonal overlap.

8. A moveable, and in particular rotating molding installation with jackknife-type molds for the production, by blow molding or stretch-blow molding, of containers, such as bottles, of thermoplastic polyester, such as PET, from a heated preform, said installation comprising a cam and roller-type guiding device for controlling the opening and closing of said jackknife-type molds,
    wherein the guiding device is arranged in accordance with claim 1.

* * * * *